Sept. 1, 1970  D. R. HOBART  3,526,871

ELECTRICAL CONNECTOR

Filed Feb. 9, 1968

*INVENTOR.*
DAVID R. HOBART

BY *Featherstonhaugh & Co.*

ATTORNEYS

United States Patent Office 3,526,871
Patented Sept. 1, 1970

3,526,871
ELECTRICAL CONNECTOR
David R. Hobart, Rexdale, Ontario, Canada, assignor to Gremar Connectors (Canada) Ltd., Rexdale, Ontario, Canada, a corporation of Canada
Filed Feb. 9, 1968, Ser. No. 704,397
Int. Cl. H01r 17/16
U.S. Cl. 339—177                    5 Claims

ABSTRACT OF THE DISCLOSURE

This invention relates to electrical connectors of the type commonly used for securing co-axial cables in a variety of installations. Each connector consists of a sleeve, a clamping ring and a complementary coupling member. The clamping ring fits within the sleeve and in use it is compressed into clamping engagement with a co-axial cable by threading the complementary coupling member into the sleeve. A feature of the present invention is the improvement which provides means within the sleeve for retaining the clamping ring to prevent it falling out of the sleeve during the assembly and installation of the connector. The retaining means includes an internal thread cut in the sleeve and a complementary external thread cut on the clamping ring such that the clamping ring threads into the sleeve. Another feature of this invention is the improved seal which is achieved by employing an elastic sealing ring which is compressed by the relative axial movement of the sleeve and the complementary coupling member. The complementary coupling member presses against the clamping ring which in turn applies axial pressure to the sealing ring and thereby forces the sealing ring radially inwardly into contact with a cable.

FIELD OF INVENTION

Figure 1:
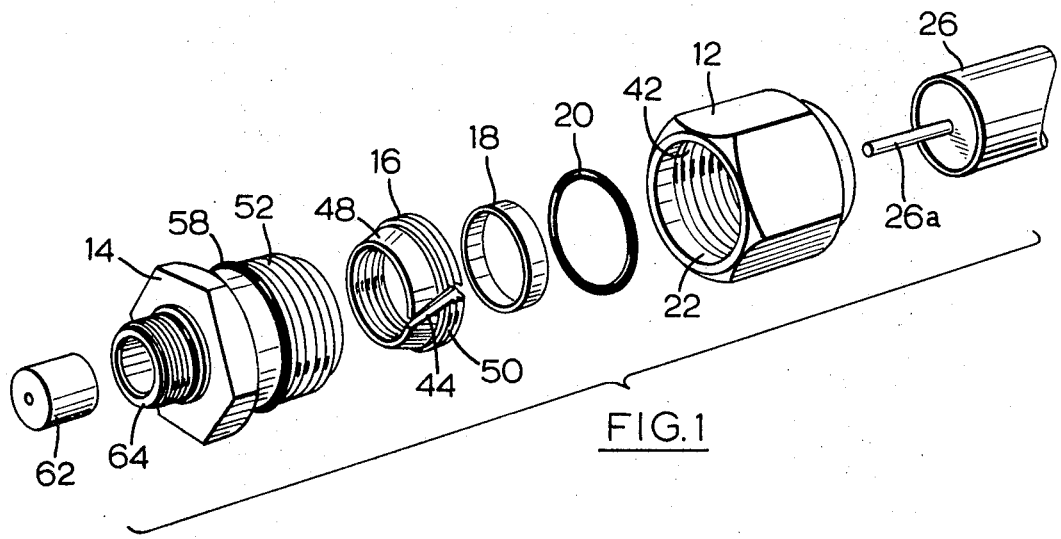

This invention relates to cable connectors. In partticular this invention relates to a cable connector of the type which is suitable for use with the co-axial type cables commonly used in the transmission of electrical wave energy.

DESCRIPTION OF PRIOR ART

Normally a cable connector consists of three basic elements together with a number of sealing rings. The three basic elements are a coupling sleeve, a clamping ring and a complementary coupling member. A clamping ring is adapted to fit within the sleeve member and it is compressed into clamping engagement with a cable by the co-operative action of the coupling sleeve and the complementary coupling means. The clamping ring is formed to provide a clearance fit within one end of the sleeve such that it may be positioned within the sleeve or removed from the sleeve as required. It has been found in practice that the clamping ring frequently drops out of the coupling sleeve when the coupling sleeve and complementary coupling member are disengaged prior to the installation of the connector. The time wasted in finding a clamping sleeve after it has fallen out of a connector sleeve and reassembling the connector can be quite substantial and it is a complete loss.

Considerable difficulty has been experienced in achieving a satisfactory seal between a connector and the external sheath of a co-axial type cable. A cable such as the co-axial cable commonly used in the transmission of electrical wave energy usually consists of an outer jacket of sheet metal or braided metal such as copper or aluminum surrounding and insulated from a centre conductor of stranded or solid copper wire. It has been found that in outdoor uses the pressure created by rain water running along a downwardly inclined cable and impinging upon a connector can overcome the conventional sealing rings used within a connector. Normally a conventional O-ring is used to prevent water entering the connector by way of the clearance gap between the connector and the external surface of the cable. Normally O-rings are statically located in preformed channels or grooves within the connector sleeve and it has been found that when the O-ring is sufficiently tightly sealed against the surface of a cable to withstand the high pressures discussed above it can be too tight to enable the cable to be easily positioned within the connector for easy assembly in use.

SUMMARY OF INVENTION

The present invention overcomes the difficulties of the prior art discussed above by firstly providing a connector assembly wherein the clamping ring cannot fall freely out of its operative position within the connector sleeve. According to an embodiment of the present invention an electrical connector for attachment to a co-axial cable comprises a clamping ring adapted to compress radially when subjected to axial pressure, the clamping ring being formed to receive a co-axial cable. The connector also includes a coupling sleeve formed on its inside with means for retaining said clamping ring therein in axial alignment therewith, the sleeve being adapted to receive a coaxial cable. Complementary coupling means are adapted to enter the coupling sleeve to apply axial pressure to the clamping ring and thereby compress the clamping ring radially into engagement with a cable in use.

The present invention also overcomes the further difficulties of the prior art discussed above by providing an electrical connector for attachment to a co-axial cable which has sealing means capable of providing a tight seal between the connector and the cable. According to an embodiment of this invention an electrical connector for attachment to a co-axial cable comprises a clamping ring adapted to compress radially when subjected to axial pressure, the clamping ring being formed to receive a co-axial cable. The connector also includes a coupling sleeve formed to receive the clamping ring in axial alignment therewith. The sleeve is adapted to receive a co-axial cable. A sealing ring of elastic material fits within means formed within the sleeve for retaining the sealing ring in the sleeve. The connector also includes complementary coupling means adapted to enter the coupling sleeve to apply axial pressure to the sealing ring and thereby force the sealing ring radially into sealing engagement with a cable in use. The complementary coupling means also compresses the clamping means into clamping engagement with a cable to clamp the connector to a cable in use.

Figure 2:
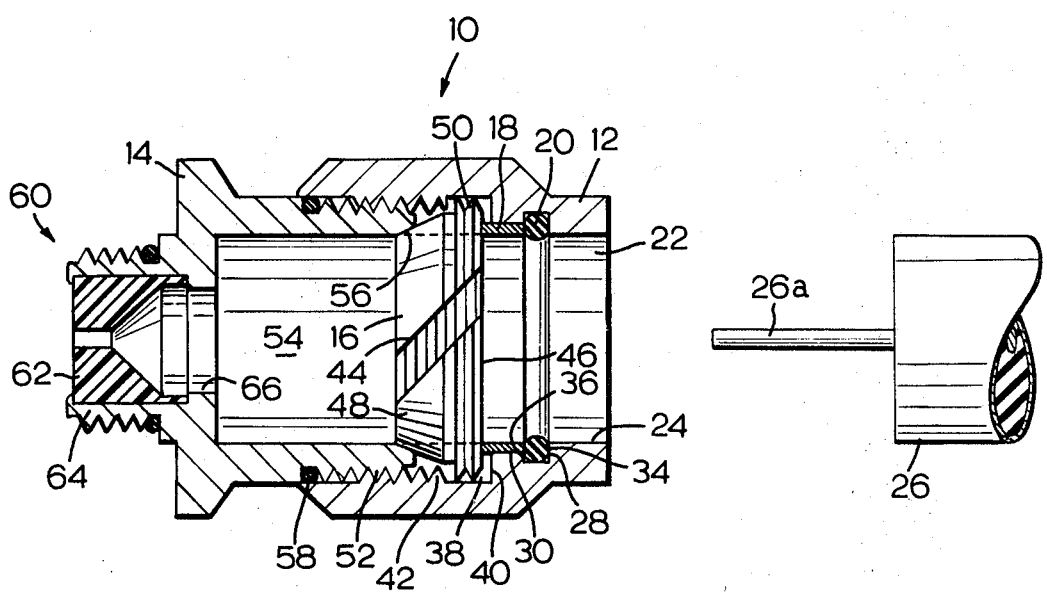

The invention will be more clearly understood after reference to the following detailed specification read in conjunction with the drawings, wherein:

FIG. 1 is an exploded view of a co-axial cable connector according to an embodiment of the present invention, and FIG. 2 is a cross-sectional view of the assembled connector of FIG. 1.

Referring now to the drawings the reference numeral 10 refers generally to a connector assembly according to an embodiment of the present invention. The connector includes a coupling sleeve 12, a complementary coupling member 14, a compressible clamping ring 16, a spacer ring 18 and an elastic sealing ring 20. The elements of the connector other than the elastic sealing ring may be made from any suitable metal such as aluminum, copper, brass or steel. In some instances where the connector itself is a conductor it is preferable to use copper or aluminum. The connector is generally used in conjunction with a co-axial cable such as that illustrated at 26 in FIG. 2. The co-axial cable generally consists of an outer sheath of aluminum or the like and a central conductor 26a of copper.

A coupling sleeve 12 is formed with a passage 22 which extends therethrough. A collar 24 is formed at one end of the passage 22 to receive the cable 26 in a close fitting sliding relationship. Collar 24 extends inwardly of the passage 22 to an O-ring groove 28. Inwardly of the O-ring groove 28 the passage 22 has a cylindrical bearing surface 30 which is adapted to receive the spacer ring 18 in a close fitting sliding relationship. It will be noted that the diameter of the portion of the passage 22 which forms the bearing surface 30 is greater than the diameter of the collar portion 24 such that the shoulder 34 of the O-ring groove 28 is of greater height than the shoulder 36 thereof. The internal diameter of the spacer ring 18 is adapted to receive the cable 26 in a close fitting sliding relationship.

Inwardly of the bearing surface 30 the coupling sleeve 12 is formed with a first circumferentially extending groove which has a diameter substantially greater than the diameter of the bearing surface 30 and forms a clamping shoulder 40 which limits the axial movement of the clamping ring 16 in one direction as will be described hereinafter. The first circumferentially extending groove 38 extends from the clamping shoulder 40 to an internal thread 42 which extends to the other end of the passage 22. The clamping ring 16 is split along a helical path 44 which extends over its entire length. The internal diameter of the clamping ring 16 in its expanded condition is adapted to receive a cable in a free sliding relationship. The internal surface of the clamping ring 16 is preferably formed with a plurality of circumferentially extending ridges which bite into the outer surface of the cable when the clamping ring is compressed to provide a firm connection therewith. The clamping ring 16 is formed with a substantially flat end face 46 at one end thereof and a tapered end face 48 at the other end thereof. Flat end face 46 is adapted to contact one end of the spacer ring 18 and the movement of the clamping ring 16 in one axial direction within the circumferentially extending groove 38 is limited by the shoulder 40 abutting the flat end face 46. The clamping ring 16 is also formed with an externally threaded portion 50 which is adapted to be threadably received by the internally threaded portion 42 of the passage 22. The clamping ring 16 is located within the recess 38 by threading the externally threaded portion thereof through the internally threaded portion 42 and it may be removed by reversing the threading operation. It will be apparent that the threaded portion 42 prevents the clamping ring 16 from falling out of the circumferentially extending groove 38 and consequently it cannot be dropped by the operator while attempting to connect the connector to a cable. The complementary coupling member 14 has an externally threaded end portion 52 adapted to threadably engage the internally threaded portion 42 of the coupling sleeve 12. The complementary coupling member 14 has an internal passage 52 which is adapted to receive an end portion of the cable 26 in a close fitting sliding relationship. The passage 54 is formed with a flared end 56 which extends over the tapered end 48 of the clamping ring 16. An O-ring elastic sealing member 58 is carried by the external surface of the complementary coupling member 14 and seals the connector against moisture entering by way of the threaded connection. The end of the complementary coupling member 14 generally indicated by the reference numeral 60 may have any one of a number of forms depending upon the use for which the connector is intended and the particular structure illustrated in the drawings represents only one of the many forms which the complementary coupling member may have. In the form illustrated the complementary coupling member has a dielectric member 62 of Teflon (trademark) or the like which is housed in an extension 64. A passage 66 is formed in the end wall of the complementary coupling member 14 and the center conductor 26a of the cable 26 passes through the passage 66 to the dielectric member 62.

When the connector is packaged for shipping it is normally assembled with the O-ring 20, the spacer ring 18 and the clamping ring 16 mounted within the sleeve coupling 12 and retained therein by the complementary coupling member 14. Normally when a connector is used the mechanic will disconnect the complementary coupling member and the sleeve and pass the sleeve over the end of a cable. As previously indicated it is at this point that the known clamping rings frequently fall out of the sleeve coupling members and cause delays in the assembly operation. When the sleeve coupling is located over the cable 26 the complementary coupling member is located over the end of the cable 26 with the conductor 26a extending through the dielectric member 62. The sleeve coupling 12 and complementary coupling member 14 are then threadably engaged and tightened upon each other. The tightening action causes the flared end 56 of the complementary coupling member 14 to bear upon the tapered end of the clamping ring 16. This action causes the flat end face 46 of the clamping ring 16 to bear against the spacer ring 18 which in turn moves axially to apply axial pressure to the O-ring 20. The application of axial pressure to the O-ring 20 which is restrained on three sides by the groove in which it is located forces the O-ring radially inwardly into sealing engagement with the outer surface of the cable 26. The action of the flared surface 56 on the tapered surface 48 of the clamping ring compresses the clamping ring to close the gap 44 and to firmly clamp the cable 26 within the assembled connector.

From the aforegoing it will be apparent that the present invention achieves an effective clamping and an effective sealing of a cable within a connector while requiring only one tightening action. Where the outer surface of the cable to which the connector is attached is slightly deformed or scored the sealing ring 20 will nevertheless be forced into close engagement with the cable and thus slight imperfections in the cable can be compensated for by the use of this type of connector.

What I claim is:

1. An electrical connector for attachment to a coaxial cable comprising: a clamping ring formed to receive a coaxial cable, said clamping ring adapted to compress radially when subjected to axial pressure and having thread means formed on the exterior thereof; a coupling sleeve adapted to receive said coaxial cable and said clamping means, the sleeve retaining said clamping ring therein in axial alignment therewith, said sleeve formed on its inside with a circumferentially extending groove, said groove having a sufficient axial extent to receive the threaded portion of said clamping ring, said sleeve being formed with internal thread means and adapted to cooperate with said external thread means of the clamping ring to permit said clamping ring to enter said groove; complementary coupling means adapted to engage said coupling sleeve to apply axial pressure to said clamping ring and thereby compress said clamping ring radially into engagement with the cable in use: a sealing ring of elastic material; means within said sleeve for retaining said sealing ring within said sleeve; and a spacer ring disposed between said sealing ring and said clamping ring, said complementary coupling means, said spacer ring and said coupling sleeve being adapted to cooperate with one another to apply axial pressure to said sealing ring and thereby force said sealing ring radially into sealing engagement with a cable in use.

2. An electrical connector as claimed in claim 1 wherein said means for retaining said sealing ring comprises a circumferentially extending sealing shoulder formed in said sleeve for restraining said sealing ring against axial movement in the direction away from said clamping ring, said complementary coupling means being adapted to move said clamping ring axially relative to said sleeve to compress said sealing ring between said spacer ring and sealing shoulder and thereby force said sealing ring radially inwardly to seal against a cable.

3. An electrical connector, as claimed in claim 2, wherein said clamping ring is formed with a substantially flat end face disposed towards said spacer ring and said sealing shoulder, said flat end face cooperating with said spacer ring and said sealing shoulder to apply axial pressure to said sealing ring.

4. An electrical connector as claimed in claim 3 wherein said coupling sleeve is formed on its inside with a clamping shoulder adapted to abut said flat end face of said clamping ring to limit the axial movement of said clamping ring and said spacer ring toward said sealing shoulder and thereby limit the axial pressure applied to said sealing ring.

5. An electrical connector, as claimed in claim 4, further including dielectric means disposed in the interior of said complementary means, said dielectric means being formed with an aperture therein which is adapted to receive the interior conductor of said coaxial cable.

References Cited
UNITED STATES PATENTS

| | | |
|---|---|---|
| 2,479,483 | 8/1949 | Ekleberry. |
| 2,564,302 | 8/1951 | Fraser. |
| 2,870,420 | 1/1959 | Malek. |
| 3,010,747 | 11/1961 | Bondon _____ 287—116 |
| 3,109,052 | 10/1963 | Dumire et al. |
| 3,171,707 | 3/1965 | Powell _____ 339—177 |
| 3,292,136 | 12/1966 | Somerset _____ 339—177 |
| 3,332,052 | 7/1967 | Rusinyak _____ 339—177 |

DAVID J. WILLIAMOWSKY, Primary Examiner

P. C. KANNAN, Assistant Examiner